United States Patent
Deaton et al.

(10) Patent No.: US 12,491,215 B2
(45) Date of Patent: Dec. 9, 2025

(54) PREBIOTIC BACTERIOPHAGE CONTAINING COMPOSITION FOR TREATMENT OF GASTROINTESTINAL INFLAMMATION

(71) Applicant: Deerland Enzymes, Inc., Kennesaw, GA (US)

(72) Inventors: John Deaton, Kennesaw, GA (US); Ana Maria Cuentas, Woodstock, GA (US)

(73) Assignee: Deerland Enzymes, Inc., Kennesaw, GA (US)

( * ) Notice: Subject to any disclaimer, the term of this patent is extended or adjusted under 35 U.S.C. 154(b) by 322 days.

(21) Appl. No.: 16/141,687

(22) Filed: Sep. 25, 2018

(65) Prior Publication Data

US 2019/0255122 A1 Aug. 22, 2019

Related U.S. Application Data

(60) Provisional application No. 62/690,703, filed on Jun. 27, 2018, provisional application No. 62/562,904, filed on Sep. 25, 2017.

(51) Int. Cl.

| | | |
|---|---|---|
| *A61K 35/76* | (2015.01) | |
| *A23L 29/00* | (2016.01) | |
| *A23L 33/00* | (2016.01) | |
| *A23L 33/135* | (2016.01) | |
| *A61K 9/00* | (2006.01) | |
| *A61K 35/74* | (2015.01) | |
| *A61K 35/741* | (2015.01) | |
| *A61P 1/04* | (2006.01) | |
| *A61P 25/00* | (2006.01) | |
| *A61K 35/00* | (2006.01) | |

(52) U.S. Cl.
CPC ............ *A61K 35/74* (2013.01); *A23L 29/065* (2016.08); *A23L 33/135* (2016.08); *A23L 33/30* (2016.08); *A61K 9/0053* (2013.01); *A61K 35/741* (2013.01); *A61P 1/04* (2018.01); *A61P 25/00* (2018.01); *A23V 2002/00* (2013.01); *A23V 2200/3202* (2013.01); *A23V 2200/3204* (2013.01); *A61K 2035/115* (2013.01)

(58) Field of Classification Search
CPC .... A61K 35/74; A61K 35/741; A61K 9/0053; A61K 2035/115; A61K 9/5068; A61K 35/76; A23L 33/30; A23L 29/065; A23L 33/135; A61P 25/00; A61P 1/04; A23V 2002/00; A23V 2200/3202; A23V 2200/3204; Y02A 50/30

See application file for complete search history.

(56) References Cited

U.S. PATENT DOCUMENTS

| | | | |
|---|---|---|---|
| 9,839,657 B2 | 12/2017 | Deaton et al. | |
| 2015/0297648 A1* | 10/2015 | Deaton | C12N 1/20 |
| | | | 424/93.44 |
| 2020/0078425 A1* | 3/2020 | Bridgewater | C12N 7/00 |

OTHER PUBLICATIONS

Grubb, D. et al., PHAGE-2 Study: Supplemental Bacteriophages Extend Bifidobacterium animalis subsp. lactis BL04 Benefits on Gut Health and Microbiota in Healthy Adults, 2020, Nutrients, 12(8), 1-15 (Year: 2020).*
Weir, T., Phage Study: Bacteriophages as Novel Prebiotics, 2017, ClinicalTrials.gov NCT03269617, 1-7 (Year: 2017).*
Probiotic America, 2016, https://web.archive.org/web/20160916133751/https://probioticamerica.com/products/perfect_flora/ (Year: 2016).*
Febvre, H. P. et al. PHAGE Study: Effects of Supplemental Bacteriophage Intake on Inflammation and Gut Microbiota in Healthy Adults, 2019, Nutrients, 11(666): 1-12 (Year: 2019).*
Kang, M. et al. Association of plasma endotoxin, inflammatory cytokines and risk of colorectal adenomas, 2013, BMC Cancer, 13(91): 1-8 (Year: 2013).*
Elbreki, M., et al., Bacteriophages and Their Derivatives as Biotherapeutic Agents in Disease Prevention and Treatment; Journal of Viruses, vol. 2014, Article ID 382539, 20 pages.
Sheflin, A., et al., Dietary Supplementation with Rice Bran or Navy Bean Alters Gut Bacterial Metabolism in Colorectal Cancer Survivors; HHH Public Access, Mol Nutr Food Res. (2017) Jan. 61(1): 1-20. doi: 10.1002/mnfr.201500905.

* cited by examiner

*Primary Examiner* — Louise W Humphrey
(74) *Attorney, Agent, or Firm* — Amin Wasserman Gurnani LLP; Jonathan J. Krit; George M. Carrera, Jr.

(57) ABSTRACT

This disclosure provides a method of treating gastrointestinal inflammation such as inflammatory bowel disease (IBS) with a bacteriophage containing composition. The bacteriophage containing composition can be used as prebiotic supplementation and support of the gastrointestinal microflora. This disclosure relates to compositions that comprise one or more types of bacteriophage and methods of using such bacteriophages as a prebiotic to promote the growth of beneficial bacteria by decreasing harmful bacterial populations and releasing nutrients into the environment for good bacteria in the digestive system of an individual.

3 Claims, 7 Drawing Sheets

PREBIOTIC BACTERIOPHAGE CONTAINING COMPOSITION FOR TREATMENT OF GASTROINTESTINAL INFLAMMATION

This application claims the benefit of U.S. Provisional Applications 62/562,904, filed on Sep. 25, 2017, and 62/690,703, filed on Jun. 27, 2018, each of which is hereby incorporated by reference in its entirety.

TECHNICAL FIELD

This disclosure relates to a method of treating gastrointestinal inflammation such as inflammatory bowel disease (IBS) with a bacteriophage containing composition. The bacteriophage containing composition can be used as prebiotic supplementation and support of the gastrointestinal microflora. Disclosed herein are compositions that comprise one or more types of bacteriophage and methods of using such bacteriophages as a prebiotic to promote the growth of beneficial bacteria by decreasing harmful bacterial populations and releasing nutrients into the environment for good bacteria in the digestive system of an individual.

BACKGROUND

The United States Food and Drug Administration (FDA) defines prebiotics as "a non-digestible food ingredient that beneficially affects the host by selectively stimulating the growth and/or activity of one or a limited number of bacteria in the colon, and thus improves host health" (Gibson, G. R. and Roberfroid, M. B., "Dietary Modulation of the Human Colonic Microbiota: Introducing the Concept of Prebiotics," *Journal of Nutrition* (1995)125: 1401-1412).

A proliferation of harmful bacteria in the gut can rob the body of the essential nutrients it needs by consuming those nutrients the body would normally absorb. Symptoms of unbalanced bacterial flora may include abdominal pain, indigestion, bloating, food allergies, and malnutrition, among other maladies. In many cases, good bacteria have a difficult time displacing the unwanted bacteria and require help; this is where prebiotics come into play.

Prebiotics are generally fibers or starches (e.g., oligosaccharides) that have been shown to be beneficial; however, these can have some drawbacks, including: requiring large doses to be effective, causing flatulence, causing sensitivity to their specific environment, and only working in the colon, among other problems.

Intestinal health and the gut microbiota have increasingly been linked with various chronic health outcomes. Imbalances in the gut microbiota resulting from poor diet, stress, antibiotic use, and other lifestyle and environmental factors is associated with development of intestinal inflammation and bowel irregularities. Several autoimmune, metabolic conditions and even mental health may also be rooted in the gut and influenced by its microbial residents. As a result, there is a growing interest in identifying dietary supplements that favorably modulate gut microbial populations. Thus, there exists a critical need to identify effective methods of manipulating the gut microbiota, and establishing their safety and potential impacts on human health.

Bacteriophages (or phages) are among the candidates being explored as potential microbial modifiers to promote intestinal health. These ubiquitous, bacteria-targeting viruses exhibit a high degree of host specificity, suggesting utility for selectively reducing pathogenic or pro-inflammatory bacteria in the microbial milieu. The antibacterial activity of phages was first observed in the waters of the Ganges and Jumna rivers in India in 1896. In 1917, Felix d'Herelle demonstrated their clinical relevance by isolating and applying phages to treat numerous bacterial infections. However, despite promising early results, the concept of phage therapy lost momentum with the introduction of broad-spectrum antibiotics, which allowed treatment of bacterial diseases without the need to identify a specific causal organism. The host specificity of phages, which has limited their widespread application as clinical antimicrobials, may be advantageous when considering their use as microbiota-modulating dietary supplements. While antibiotics can cause or exacerbate microbiota imbalances, or dysbiosis, phages offer the opportunity to subtly and selectively modify the gut microbiota. The US FDA lists many bacteriophages as Generally Recognized as Safe (GRAS) for human consumption because they are abundant in nature, reside naturally in the human gastrointestinal tract, and are inadvertently consumed by humans on a daily basis. They represent good therapeutic agents as long as they are obligately lytic, stable under typical storage conditions and temperatures, subject to appropriate efficacy and safety studies, and ideally fully sequenced to confirm the absence of undesirable genes such as toxins.

If it could be shown that human subjects with mild to moderate gastrointestinal distress would benefit from treatment with one or more bacteriophages, this would represent a contribution to the biomedical arts.

SUMMARY

The present invention relates to a method of treating gastrointestinal inflammation such as inflammatory bowel disease (IBS) using a bacteriophage containing composition (e.g. PREFORPRO® supplement comprising 4 bacteriophage strains: LH01-Myoviridae, LL5-Siphoviridae, T4D-Myoviridae, and LL2-Myoviridae).

A method for treating or preventing gastrointestinal inflammation or pain in a human is described, comprising orally administering to the human in need of such treatment a bacteriophage containing composition comprising one or more bacteriophages selected from the Siphoviridae family or the Myoviridae family.

DETAILED DESCRIPTION

Figure 1:
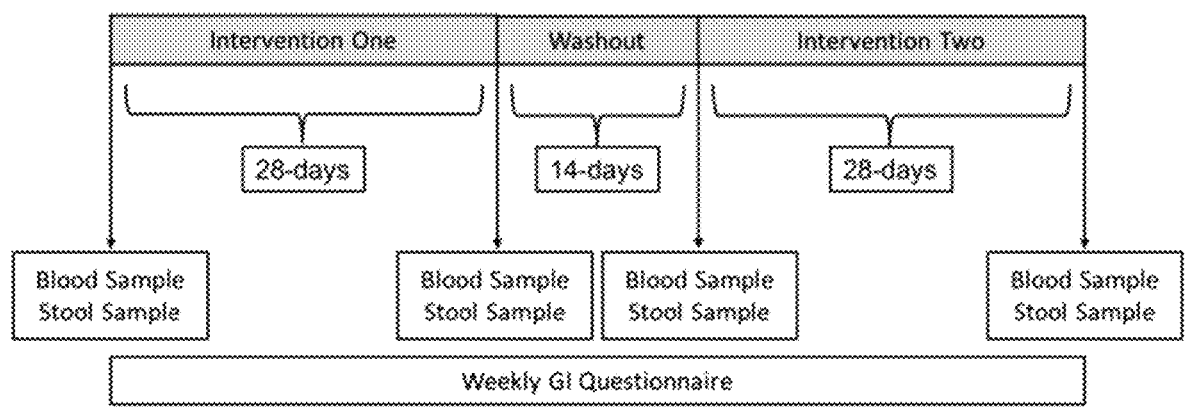
FIG. 1 depicts, in one embodiment, the PHAGE study design schematic. GI=gastrointestinal.

In its principal embodiment, a bacteriophage containing composition is used for treatment and/or prevention of gastrointestinal (GI) inflammation and like conditions, for example, irritable bowel disease (IDS) in a human subject. One useful bacteriophage containing composition is PRE-FORPRO® available from Deerland Enzymes, Inc. (Kennesaw, Georgia).

As described herein, PREFORPRO® may be used in an effective total daily dose from about 10 mg to about 20 mg. One preferred daily dose is about 15 mg. In an embodiment, the bacteriophage containing composition can include one or more bacteriophages in an amount about 1 mg to about 1000 mg containing $1\times10^3$ to $1\times10^9$ plaque-forming units/dose (PFU/dose).

The dose administered during the trial was 15 mg of total phage per person per day, which is well within the GRAS quantities found in many conventional foods (e.g., dairy products and fermented foods). Participants were administered one 285-mg capsule per day for 28 days.

The bacteriophage containing composition can include, but is not limited to, bacteriophages of the family Myoviridae. Further, the bacteriophage containing composition can include, but is not limited to, bacteriophages of the family Siphoviridae. One or more bacteriophages may be advantageously combined, from one or more families as described. Effective dosages may be modified to fall within the mass range as described above. U.S. Pat. No. 9,839,657 to Deerland Enzymes, Inc. is hereby incorporated by reference in its entirety.

In one embodiment, administration of PREFORPRO® (15 mg daily dose) statistically improved gastric function while reducing GI inflammation. Additionally, subjects reported reduction in pain in small intestine and/or colon.

In one example, detailed in the Examples below, a randomized, double-bind, placebo-controlled study describing a method of administering bacteriophage PREFORPRO® composition for the treatment of GI distress and symptoms was performed.

The gut microbiota has been recognized as a critical regulator of human health, and novel interventions to selectively modulate the microbiota are actively being sought. Bacteriophages (bacterial viruses) have the potential to selectively eliminate specific detrimental microbes while enhancing beneficial microbe populations. The Bacteriophage for Gastrointestinal Health (PHAGE) study aimed to determine the safety and tolerability of supplemental bacteriophage consumption in a population of healthy adults with mild to moderate gastrointestinal distress.

The objective of the current study was to determine how daily consumption of supplemental *E. coli*-targeted phages (commercially sold as PREFORPRO®) influences the gut microbiota of healthy adults with self-reported occasional gastrointestinal distress. In addition, effects on microbial production of short chain fatty acids were determined as well as exploring whether phage consumption altered lipid metabolism and parameters of local and systemic inflammation. 28-days of phage consumption did not substantially alter global gut microbiota profiles of most individuals, but did reduce populations of the target bacteria, *E. coli*, as well as modifying a number of individual bacterial species, including an increase in OTUs mapping to probiotic species, *Lactobacillus delbrueckii*. A reduction in the circulating pro-inflammatory cytokine Il-4 was observed, which has been associated with autoimmune and allergic responses in human populations. These data highlight the potential of bacteriophages for selective modification of targeted microbial species without inducing dysbiosis.

The methods described herein may be further understood in connection with the following Examples. In addition, the following non-limiting examples are provided to illustrate the invention. However, the person skilled in the art will appreciate that it may be necessary to vary the procedures for any given embodiment of the invention, e.g., vary the order or steps.

Example 1

Phage Study

Forty three healthy adults, aged 18-65 with self-reported gastrointestinal distress were enrolled in the study. Eligibility was determined by a telephone or in-person eligibility screening interview prior to obtaining informed consent. Exclusion criteria included a) previous diagnosis of gastrointestinal or metabolic conditions, cancer, liver, or kidney diseases; b) pregnancy or breastfeeding, c) smoking, d) use of antibiotics in the last 2 months, and e) current medication or dietary supplement use that may impact gut microbiota. Participants were asked to maintain their regular diet and exercise habits throughout the study, refrain from supplemental prebiotics or probiotics, and to limit alcohol consumption to 1 drink per day or no more than 7 drinks per week.

For this pilot intervention, enrollment of a total of 40 participants were targeted, based on power calculations conducted on microbiota data from a previously published pilot dietary intervention (Sheflin, A. M., et al., "Dietary supplementation with rice bran or navy bean alters gut bacterial metabolism in colorectal cancer survivors," *Mol. Nutr. Food Res.* (2017) 61:1500905). Although *E. coli* is the target organism of the phage cocktail administered, this organism is often not detected or found only in very low abundance in human stool samples. However, as several synbiotic commercial formulations contain PREFORPRO® to stimulate the growth of probiotic species, changes in *Bifidobacterium* spp. were used, which are typically detected in human stool samples, as a basis of the power calculation. It was calculated that a total of 26 individuals in a crossover intervention would be sufficient to detect a significant difference (p ¼ 0.05) in populations of fecal *Bifidobacterium* with 80% power. Thus, recruitment of 43 individuals allowed the study to achieve statistical power, even with predicted 20-25% study attrition. Recruitment for this trial was conducted via flyers, e-mails, and word of mouth through alternative medicine practitioners and other health care providers. Healthy adults, with ages between 18 and 65 years, with mild to moderate gastrointestinal distress but no diagnosed gastrointestinal conditions were recruited. Eligibility was determined through email and phone screening and using an eligibility questionnaire at the study consent visit. Patients who were pregnant or breastfeeding or were previously diagnosed with celiac disease, inflammatory bowel disease, peptic ulcer disease, cancer, or other gastrointestinal or metabolic disorders were excluded from the study. Other exclusion criteria included recent antibiotic use (within 2 months of study enrollment) or the use of other medications that have been reported to alter the gut microbiota or inflammatory cytokines, including metformin, statins, and nonsteroidal anti-inflammatory drugs. Reporting of any dietary supplement use was requested and eligibility was determined on a case-by-case basis (those reporting consistent use of prebiotics or probiotics were excluded from the study). Participants were asked to maintain their typical diet and physical activity levels throughout the study and were required to refrain from recreational drugs or consuming >7 alcoholic beverages/week.

Figure 2:
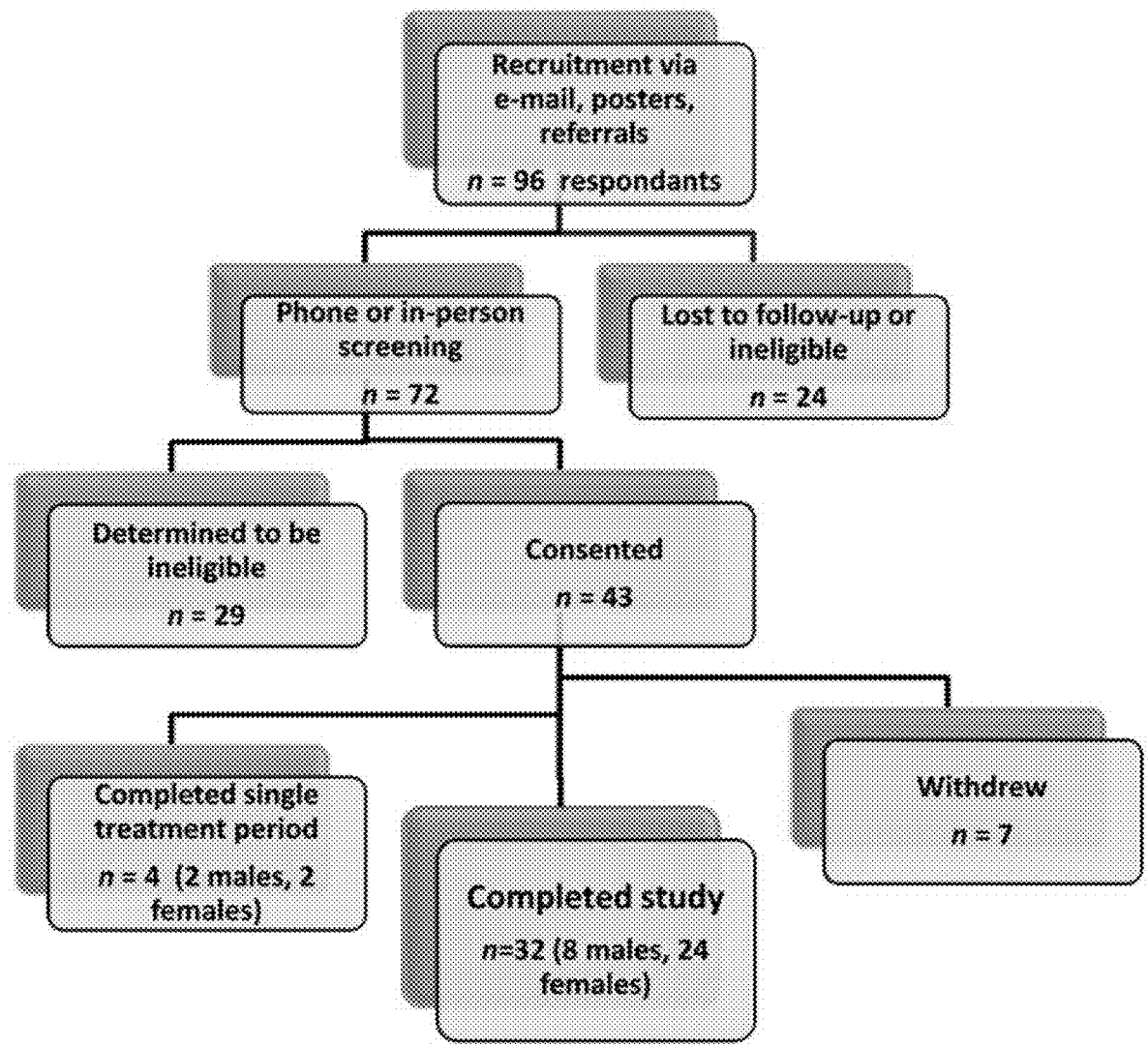
FIG. 2 depicts the PHAGE study recruitment, enrollment, and completion in a flow chart.

Participant Demographics and Compliance 96 individuals were screened who responded to recruitment efforts through e-mail, flyers, or referrals (FIG. 2). Twenty participants did not respond after their initial inquiry and an additional 4 respondents were determined to be ineligible due to pregnancy or a diagnosis of celiac disease. An additional 72 respondents were screened through phone or face-to-face conversations; 29 of these individuals were determined to be ineligible or chose not to continue with the study. The most common reasons for ineligibility included recent antibiotic use, current breastfeeding, and consistent use of restricted medications. Forty-three individuals (13 men and 30 women) met all eligibility criteria and provided written consent to participate in the study. Thirty-two individuals completed both study arms, whereas an additional 4 individuals completed the treatment (1 man) or placebo (1 man and 2 women) arm only. An additional 7 individuals dropped out of the study prior to completing either treatment. Of those 7 participants, 4 withdrew participation due to time constraints, 2 had to start antibiotic treatments during the study, and 1 withdrew due to exacerbation of gastrointestinal symptoms (it was later determined that the participant had been taking the placebo capsule, so the complaint was unlikely related to study participation).

Figure 3A:
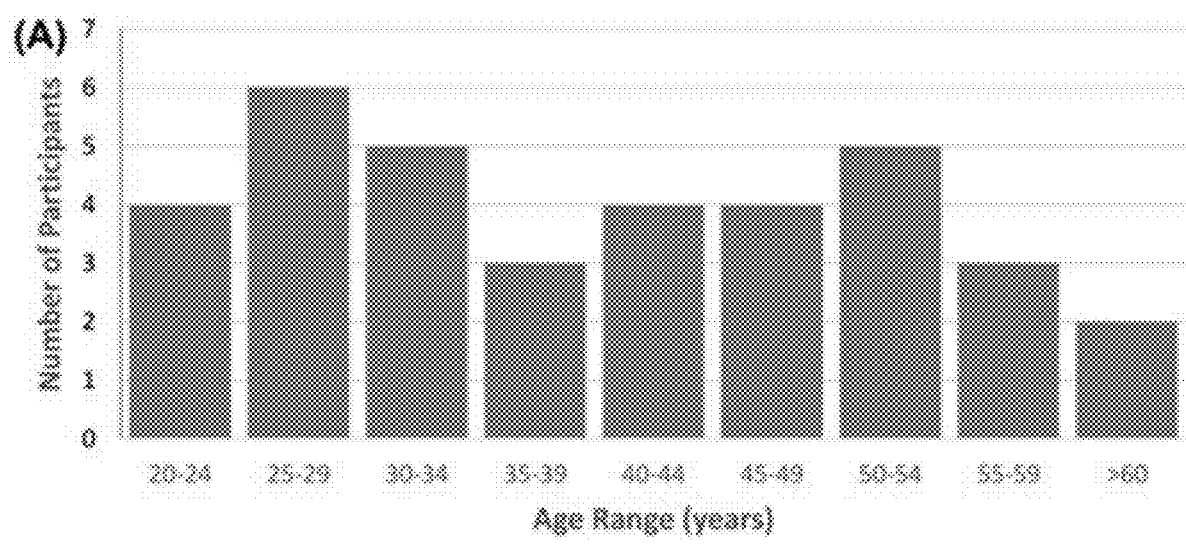
FIG. 3A depicts baseline age of participants in the PHAGE study.
Figure 3B:
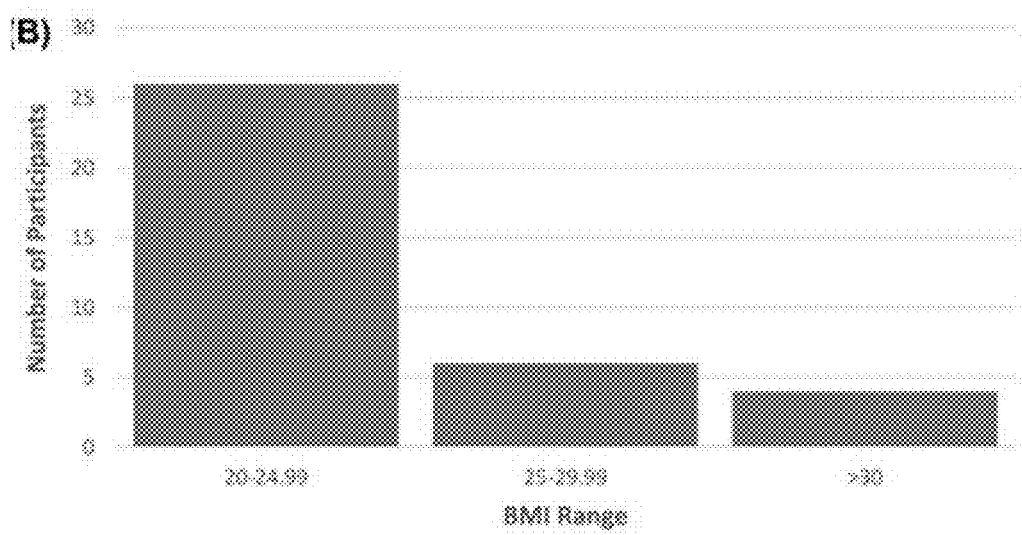
FIG. 3B depicts baseline body mass index (BMI) of participants in the PHAGE study.

Participants ranged in age from 20 to 61 years, with the average age of 40 years (FIG. 3A). The average body mass index (BMI) was 25.7 kg/m$^2$, with the majority of participants characterized as normal weight. However, the total participant BMIs ranged from 20 to 35 kg/m$^2$, with approximately one-third of the participants classified as overweight or obese by this metric (FIG. 3B). Average participant characteristics are presented in Table 1. With regard to capsule consumption, total study compliance was approximately 95%. For the treatment period, individual compliance ranged from 75% to 100%, with an average compliance of 95.6%). During the placebo period, individual compliance ranged from 61%> to 100%, with an overall average of 94.8%. Despite good adherence to study protocols regarding capsule consumption, only 75% of participants (27 of 36) completed the gastrointestinal questionnaire.

Study Design

The Bacteriophages for Gastrointestinal Health (PHAGE) study to explore the safety and tolerability of a mixture of 4 bacteriophages for consumption in humans. Study participants consumed 15-mg capsules containing 4 strains of bacteriophages (PREFORPRO®) during one 28-day period and an inert capsule during another 28-day period. The target population included healthy adults with mild to moderate gastrointestinal distress, and participants were asked to report gastrointestinal symptoms throughout the trial to assess tolerability of the treatment. In addition, comprehensive metabolic panels were used to monitor effects on blood chemistry and liver function to determine the safety of bacteriophage consumption.

Figure 4:
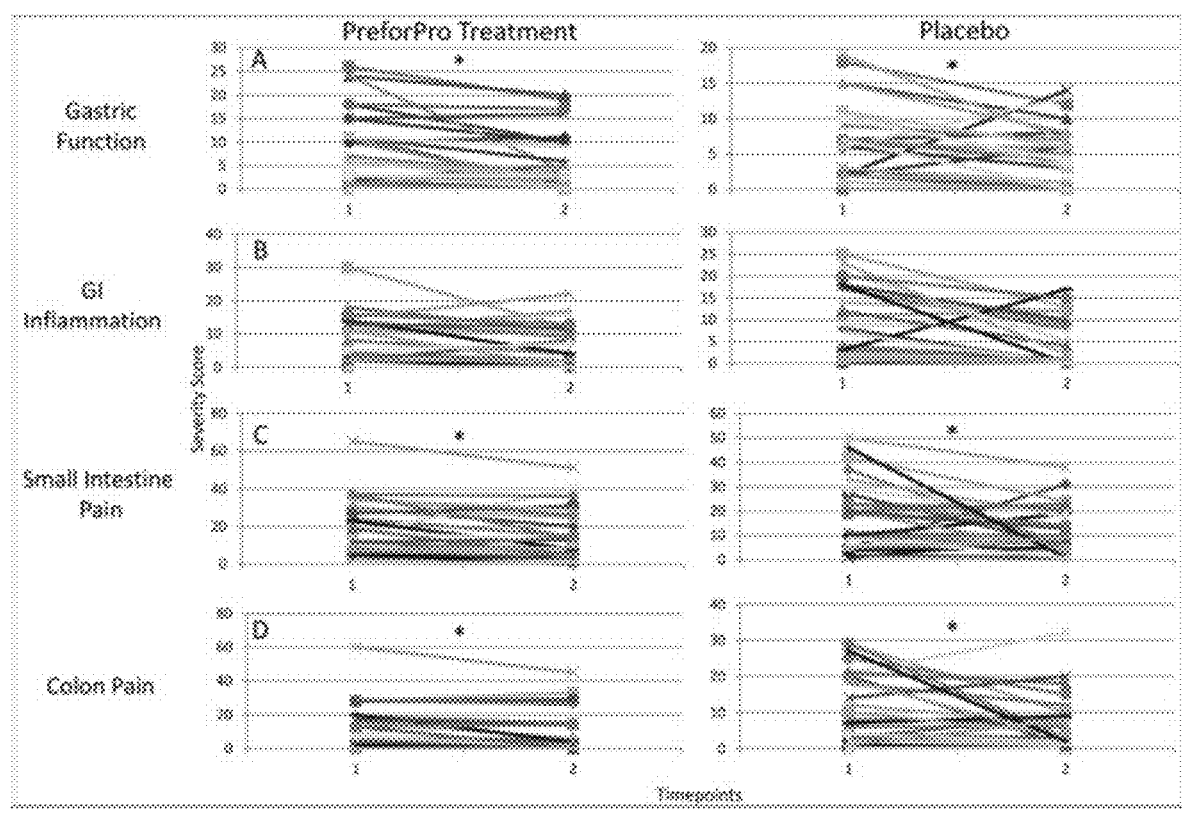
FIG. 4 depicts gastrointestinal assessment scores by individual pre- (time point 1) and post- (time point 2) treatment and placebo intervention periods. (A-D) Vertical panels show scores for different aspects of gastrointestinal distress, including gastric function (A), gastrointestinal inflammation (B), small intestine pain (C), and colon pain (D). GI=gastrointestinal.

The PHAGE study was a randomized, double-blind, placebo-controlled crossover trial that aimed to investigate the safety and tolerability of 4 supplemental bacteriophage strains (LH01-Myoviridae, LL5-Siphoviridae, T4D-Myoviridae, and LL12-Myoviridae) included in the PREFORPRO® commercial preparation by Deerland Enzymes (Kennesaw, GA USA). Enrolled participants were randomly assigned to either the placebo or treatment starting groups (blinded as treatments A and B) and were asked to consume 1 capsule daily for 28 days. This intervention was followed by a 2-week washout period prior to starting an additional 28-day intervention with the opposite treatment (FIG. 1). Participants attended a clinic visit at the Colorado State University Human Performance Clinical Research Laboratory at the beginning and end of each 28-day treatment period. During the clinic visits, participants provided a stool sample that was collected using a fecal collection container (Thermo Fisher Scientific, Waltham, MA) provided by the study investigators. Participants were instructed to collect stool within 24 hours of consuming their final capsule and to store samples frozen or refrigerated prior to returning them to the clinic. All collected stool samples were processed and stored at −80° C. to be used for future analysis of gut microbiota populations, stool metabolites, and intestinal inflammatory factors. At the clinic, participants were weighed and subjected to a fasting venous blood draw. Blood was collected in ethylenediamine tetraacetic acid (EDTA) and lithium heparin tubes. Plasma was collected by centrifugation from the EDTA tubes and stored at −80° C. for future analyses of circulating inflammatory markers and plasma lipid profiles. Blood from the lithium heparin tubes was used immediately for comprehensive metabolic profiling. Participants were also asked to complete a weekly gastrointestinal assessment published by Metagenics, Inc. (Aliso Viejo, CA) (FIG. 4) throughout the study. The assessment was provided through a personal, secure Google Docs link. Participants were asked to report any illnesses or adverse events to study personnel. Primary outcome measures included (1) results of comprehensive metabolic panels conducted at each study visit to assess blood chemistry and liver function in order to determine the safety of the treatment and (2) gastrointestinal questionnaire responses to gauge tolerability. Due to low compliance with questionnaire completion, only the questionnaires administered at the beginning and end of each treatment period were evaluated. All participants provided written informed consent prior to study enrollment. The study protocols were approved by the Colorado State University Institutional Review Board (protocol number 16-6666HH). This clinical trial was registered at ClinicalTrials.gov (NCT03269617).

The study was conducted as a randomized, double-blind, placebo-controlled crossover intervention trial, with two 28-day intervention periods and a washout period of at least two weeks between treatments. The study was conducted at the Human Performance Clinical Research Laboratory at Colorado State University. At each clinic visit (t=0 and t=28 for each intervention period, 4 visits in total) participants provided a fresh stool sample that had been collected at home within 24 hours of their visit. A fasted blood sample was then collected in EDTA and lithium heparin tubes. Collected stool and plasma samples were stored at −80° C. prior to use.

Intervention

The 4 bacteriophages used in the PHAGE study (LH01-Myoviridae, LL5-Siphoviridae, T4D-Myoviridae, and LL12-Myoviridae) were contained within an inert carrier consisting of rice maltodextrin and coconut oil triglycerides. Treatment and placebo (i.e., rice maltodextrin and coconut oil triglycerides) capsules were coded and provided by Deerland Enzymes. These organisms were shown to be purely lytic and are known to infect a range of *Escherichia* coli strains, including *E. coli* K12, and 16 enterotoxigenic *E. coli* strains and 2 enterohemorrhagic strains. The phages used in this study contain no genes encoding any known toxins or antibiotic risk factors, nor did they contain genetic elements shown to be harmful to humans. They are not likely to be able to infect and kill other bacteria outside of the Enterobacteriaceae and were not expected to negatively alter the natural microbiota of the human intestine. On multiple occasions, the U.S. Food and Drug Administration has affirmed GRAS status for other bacteriophage-containing compounds, as long as they were lytic with specific targeted pathogens and specific intended uses. The dose administered during the trial was 15 mg of phage per person per day, which is well within the GRAS quantities found in many conventional foods (e.g., dairy products and fermented foods). Participants were administered one 285-mg capsule per day for 28 days.

Gastrointestinal Health Assessment

Gastrointestinal health was evaluated quantitatively at the beginning and end of each treatment period to gain information on the treatment's perceived effects on gastrointestinal symptoms. The gastrointestinal questionnaire had 4 sections: gastric function (section A), gastrointestinal inflammation (section B), small intestine and pancreas (section C), and colon pain (section D). Within each section, participants ranked questions based on symptoms, choosing from 0 (no/rarely), 1 (occasionally), 4 (often), or 8 (frequently). Section A of the questionnaire addressed gastric function and was measured on a scale of 1 (low priority) to 56 (high priority). Section B of the questionnaire addressed gastrointestinal inflammation and was measured from 1 (low priority) to 72 (high priority). Section C of the questionnaire addressed small intestine and pancreas function and was measured from 1 to 80. Finally, section D addressed colon function and was measured on a scale from 1 to 72. Participants were provided with a secure, personal Google Docs link after each clinic visit and were asked to complete the questionnaire. The results of the 4 sections A-D are reflected in FIG. 4.

In total, 27 participants completed the gastrointestinal health questionnaire at the beginning and end of each treatment period. In general, women reported greater baseline symptom severity than men (Table 1). Statistical analysis showed a sequence effect for all 4 sections of the questionnaire. Scores in sections A (treatment to placebo, $p<0.01$; placebo to treatment, $p<0.01$) and C (treatment to placebo, p ¼ 0.03; placebo to treatment, $p<0.01$) were bidirectionally influenced by starting sequence. Scores in sections B (placebo to treatment, $p<0.01$) and D (placebo to treatment, p ¼ 0.03) were significantly negatively affected by starting in the placebo group and then receiving the treatment. After we controlled for sequence effects, we observed a significant improvement in gastrointestinal severity scores for gastric function (section A: treatment, $p<0.01$; placebo, p ¼ 0.02), small intestine pain (section C: treatment, p ¼ 0.02; placebo, p ¼ 0.01), and colon pain (section D: treatment, $p<0.01$; placebo, p ¼ 0.03) in both treatment and placebo groups (Table 3). There was no significant improvement in perceived gastrointestinal inflammation (section B) over the course of the intervention. In addition, there were no significant differences between the final time points of the treatment and placebo periods.

TABLE 1

Participant Demographics and Baseline Gastro-intestinal Assessment Score

| Demographic | Women (n = 26) | Men (n = 10) | Study average |
| --- | --- | --- | --- |
| Age (years) | 39.7 ± 12.2 | 39.0 ± 12.8 | 39.5 ± 12.2 |
| Weight (lb) | 152.5 ± 31.6 | 170.6 ± 20.1 | 157.5 ± 29.8 |
| Height (inches) | 65.3 ± 2.7 | 71.8 ± 3.1 | 67.1 ± 4.0 |
| Body mass index (kg/m$^2$) | 25.1 ± 3.9 | 23.3 ± 2.4 | 24.6 ± 3.6 |
| True baseline gastrointestinal score | | | |
| Section A: gastric function | 12.0 ± 6.6 | 9.6 ± 8.3 | 11.4 ± 6.9 |
| Section B: gastrointestinal inflammation | 11.5 ± 8.6 | 6.3 ± 6.8 | 10.1 ± 6.9 |
| Section C: small intestine pain | 25.1 ± 12.8 | 18.7 ± 21.2 | 23.5 ± 15.0 |
| Section D: colon pain | 15.0 ± 10.3 | 12.9 ± 21.9 | 14.4 ± 13.5 |

Note:
Values are means ± standard deviations.

Comprehensive Metabolic Profiles

Fourteen different analytes in heparinized whole blood were measured to determine effects of treatment consumption on liver and kidney function as well as other parameters of metabolic regulation (Table 2). After statistical tests were performed for sequence effects, a small treatment to placebo effect was noted for creatinine (p ¼ 0.05). After we controlled for sequence effects, we observed that AST levels were lower after treatment than before treatment (p ¼ 0.03) and they were also significantly lower at the end of the treatment period compared to the end of the placebo period (p ¼ 0.04).

TABLE 2

Values for Tested Blood Analytes at the Beginning and End of Each Intervention Period

| | Reference | Treatment | | Placebo | |
| --- | --- | --- | --- | --- | --- |
| Analyte | range | Baseline | Intervention | Baseline | Intervention |
| Sodium (mmol/L) | 128-145 | 140.1 ± 3.15 | 140.5 ± 2.77 | 140.6 ± 2.30 | 140.1 ± 2.41 |

TABLE 2-continued

Values for Tested Blood Analytes at the Beginning and End of Each Intervention Period

| Analyte | Reference range | Treatment Baseline | Treatment Intervention | Placebo Baseline | Placebo Intervention |
|---|---|---|---|---|---|
| Potassium (mmol/L) | 3.6-5.1 | 3.93 ± 0.29 | 3.95 ± 0.33 | 3.96 ± 0.45 | 3.86 ± 0.37 |
| Total carbon dioxide (mmol/L) | 18-33 | 23.97 ± 2.12 | 24.94 ± 2.06$^a$ | 24.33 ± 2.53 | 25.0 ± 1.39 |
| Chloride (mmol/L) | 98-108 | 105.06 ± 2.39 | 104.86 ± 2.51 | 104.47 ± 2.57 | 104.92 ± 1.94 |
| Glucose (mg/dL) | 73-118 | 90.20 ± 9.09 | 89.68 ± 9.45 | 87.85 ± 11.37 | 91.24 ± 10.41 |
| Calcium (mg/dL) | 8.0-10.3 | 9.37 ± 0.30 | 9.47 ± 0.29 | 9.44 ± 0.56 | 9.38 ± 0.26 |
| Blood urea nitrogen (mg/dL) | 7-22 | 13.03 ± 3.37 | 13.20 ± 3.84 | 13.56 ± 4.51 | 13.15 ± 3.26 |
| Creatinine (mg/dL) | 0.6-1.2 | 0.95 ± 0.19$^c$ | 0.90 ± 0.14 | 0.91 ± 0.19 | 0.92 ± 0.15 |
| Alkaline phosphatase (U/L) | 42-144 | 52.80 ± 15.99 | 53.82 ± 14.13$^b$ | 53.58 ± 13.95 | 52.34 ± 14.08$^{a,b}$ |
| Alanine aminotransferase (U/L) | 10-47 | 28.23 ± 13.29 | 29.0 ± 14.79 | 23.64 ± 9.38 | 24.72 ± 12.22 |
| Aspartate aminotransferase (U/L) | 11-38 | 33.66 ± 15.65 | 30.14 ± 7.95$^{a,b}$ | 29.67 ± 6.57 | 29.62 ± 6.79$^b$ |
| Total bilirubin (mg/dL) | 0.2-1.6 | 1.03 ± 0.39 | 1.0 ± 0.47 | 0.97 ± 0.45 | 1.01 ± 0.41 |
| Albumin (g/dL) | 3.3-5.5 | 3.86 ± 0.21 | 3.89 ± 0.23 | 3.90 ± 0.35 | 3.85 ± 0.23 |
| Total protein (g/dL) | 6.4-8.1 | 7.37 ± 0.34 | 7.38 ± 0.29 | 7.36 ± 0.51 | 7.33 ± 0.31 |

Note.
Values are means ± standard deviations.
$^a$Denotes a significant difference (p < 0.05) between the baseline and treatment group after adjusting for period effects.
$^b$Denotes a significant difference (p < 0.05) between the treatment and placebo endpoints after adjusting for periodic effects.
$^c$Denotes a difference between the 2 baselines. The letter is placed in the baseline column whose sequence is driving this difference (i.e., a letter after the treatment baseline value indicates sequence effects in the treatment to placebo cohorts).

At each clinic visit, a fasting, venous blood sample (#3 mL) was collected in a lithium heparinized tube. Within 1 hour of collection, 120 µl of whole blood was loaded into a Piccolo Comprehensive Metabolic Panel disk and assayed using a Piccolo Xpress Chemistry Blood Analyzer (Abaxis, Union City, CA). The panel included markers of blood chemistry, metabolism, and liver function, including albumin, alkaline phosphatase (ALP), alanine aminotransferase (ALT), aspartate aminotransferase (AST), blood urea nitrogen, calcium, chloride, creatinine, sodium, potassium, total carbon dioxide (tCO2), glucose, total bilirubin, and total protein as the albumin/globulin ratio.

ALP levels were significantly higher at the end of the placebo period relative to the start of placebo consumption (p ¼ 0.05); however, they were lower than at the endpoint of the treatment period (p<0.01). tCO2 increased after the treatment relative to the beginning of the period (p ¼ 0.02) but was not significantly different from the placebo period endpoint measure. Finally, it is important to note that although some of the changes in metabolic parameters were statistically significant, the average values of the analytes were well within clinical reference ranges at all measurements.

TABLE 3

| | Treatment | | | Placebo | | |
|---|---|---|---|---|---|---|
| | Change from Baseline (SEM) | Reduced Symptom Severity | Increased Symptom Severity | Change from Baseline (SEM) | Reduced Symptom Severity | Increased Symptom Severity |
| Section A | -3.46 (1.05) | 45% | 0% | -2.31 (1.02) | 61% | 13% |
| Section B | -1.58 (1.15) | 32% | 5% | -4.37 (1.47) | 52% | 5% |
| Section C | -3.85 (1.85) | 32% | 12% | -6.70 (2.86) | 40% | 16% |
| Section D | -2.58 (1.05) | 30% | 0% | -4.03 (2.02) | 38% | 17% |

Note:
Changes in symptom severity were determined by score changes that resulted in reclassification of symptoms for a given category (i.e., moderate to mild).

Indicators of Inflammation

Figure 5:
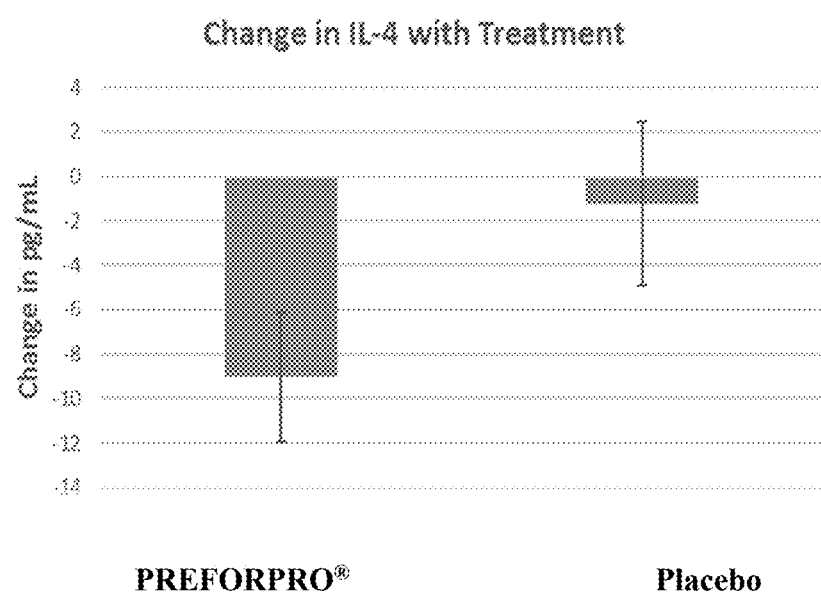
FIG. 5 depicts reduction of IL-4, an inflammatory cytokine associated with allergic responses, from baseline levels following treatment with PREFORPRO® compared to Placebo.

Of the various pro- and anti-inflammatory measures evaluated, only circulating levels of IL-4 were significantly altered during the study. It was observed that average levels of IL-4, an inflammatory cytokine associated with allergic responses, were decreased from baseline levels following treatment with PREFORPRO® (p<0.01; FIG. 5). No other inflammatory markers in the stool or blood were altered by either the treatment or placebo.

Plasma IL-4 was significantly lower with treatment A. IL-4 is produced by TH2 cells and results in higher differentiation of naive T cells to TH2. Excessive IL-4 is associated with atopy or excessive allergic responses and may influence immunity to infectious diseases by suppressing differentiation of naive T cell to TH1 cells in the face of infectious disease.

Statistical Analysis

The sequence effect (treatment to placebo or placebo to treatment) was evaluated by determining the significance of the difference between baseline values of both sequences. All continuous data were tested for the assumption of normality prior to linear regression analysis was performed. To control for the effect of sequence and repeated measures on the subject, a linear mixed model approach was taken to compare the treatment effects within each time point. Also a similar approach was taken to compare the time points within treatment and placebo separately. A p value of 0.05 was used to determine statistical significance. SAS software (version 9.4; SAS Institute, Inc., Cary, NC) was used for all statistical analysis.

Discussion

The PHAGE study was a randomized, double-blind, placebo-controlled crossover trial that was designed to carefully assess the safety, tolerability, and utility of a bacteriophage intervention that has great potential for promoting intestinal health and reducing suffering from gastrointestinal distress. Bacteriophages offer a novel and selective means of modifying the gut microbiota and thereby influencing the intestinal environment. Although bacteriophages are ubiquitous in the environment and are consistently consumed by humans in small amounts, opinions concerning the risks of bacteriophage interventions have fluctuated greatly over the past century. There have been a limited number of studies exploring the safety and tolerability of intentional consumption of bacteriophages and these studies have primarily been conducted in non-Western populations. This data suggests that the bacteriophages present in the commercial product, PREFORPRO®, are safe for daily human consumption. A small but statistically significant increase in tCO2 was observed after PREFORPRO® treatment. Low levels of tCO2 in the blood could be indicative of chronic diarrhea, and bicarbonate solutions are often used for oral rehydration in patients with watery diarrhea. The observed increase may be associated with reduced diarrhea in the test population, although this parameter was not monitored specifically. Lower AST and ALP were also observed in samples collected after the treatment compared to after the placebo control. In a previous study in mice, ALT and ALP increased after exposure to bacterial lipopolysaccharides, which are a component of the cell membrane of Gram-negative bacteria. Circulating lipopolysaccharide (LPS) is associated with system inflammation and tissue damage leading to the development of metabolic disease like type 2 diabetes. Because the bacteriophages used specifically target proinflammatory, gram negative $E.$ $coli$, it is plausible that the treatment can reduce circulating endotoxin through modulation of the gut microbiota and intestinal barrier function. Unfortunately, measures of LPS in plasma are notoriously unreliable so this outcome was not measured.

It is important to note that despite any statistical differences in the measured metabolic parameters, all measurements remained within clinically accepted ranges after 28 days of consumption, highlighting its safety in a human population. This, is in agreement with a recent study of 15 healthy adults in Bangladesh, in which the investigators reported no adverse events observed by self-report or clinical examination and clinically normal laboratory tests for liver, kidney, and hematological function after administration of a 9-phage cocktail dose of 3% 109 and 3% 107 plaque-forming units (Elbreki, M., et al., "Bacteriophages and Their Derivatives as Biotherapeutic Agents in Disease Prevention and Treatment," *Journal of Viruses* (2014) Vol. 2014: Article ID 382539, pp. 1-20).

To determine the tolerability of consumption in a target population, THE population that was recruited was healthy but suffered from gastrointestinal complaints. There were no reports of adverse events during the trial, and self-assessment of gastrointestinal symptoms suggested improvements in most parameters measured. Interestingly, gastrointestinal symptom severity was reduced in most cases during both the treatment and placebo periods. In addition, there were bidirectional crossover effects, suggesting that participants perceived relief of gastrointestinal distress just from participating in the study. Regardless, the majority of individuals reduced or maintained baseline levels of gastrointestinal distress while on the treatment, suggesting that it was tolerable and did not exacerbate symptoms.

PREFORPRO® is currently marketed as both a food and dietary ingredient and research in animal models demonstrates that when consumed simultaneously with probiotic bacteria, it stimulates their growth. Without being bound by theory, the basis of this relationship is an alteration in biochemical cycles due to release of cell contents from phage targets that support the growth of other bacteria. Prebiotics are gaining widespread popularity as dietary supplements and are typically based on formulations of resistant fiber and oligosaccharides. However, typical prebiotics are often associated with increased flatulence, bloating, and other undesirable symptoms. Therefore, due to its high tolerability in a population of individuals with gastrointestinal distress, the treatment may prove to be a viable substitute for more traditional prebiotics.

One major strength of this study is its crossover design, in which each individual serves as his or her own control. This is advantageous given the interperson variability of the microbiota, particularly in target bacterial strains, as well as individual responses to a stimulus. An additional strength of this study design is the double-blinding, thus minimizing participant and researcher bias. Limitations of this study, like others, included variable compliance among study participants. In addition, lack of dietary assessment throughout the study may be seen as a weakness, as changes in diet are typical of consumers over a 10-week period and can promote or suppress gastrointestinal symptoms over short periods of time.

Daily tracking of stool consistency and frequency would have been desirable but likely would have placed an additional burden on participants, reducing compliance and increasing attrition. Finally, although the small sample size does not allow for direct assessment of subpopulations (e.g., ethnic or life-stage groups), it does provide precise intervention effects at the population level on designated outcomes of interest and offers an overall risk-benefit assessment of whether individuals should consume bacteriophages-containing products.

Conclusions

Consumption of therapeutic doses of a mixture of 4 bacteriophages as provided herein was observed to be both safe and tolerable in a target human population of healthy individuals reporting moderate GI distress. The present study suggests that one or more bacteriophages may be used as a dietary supplement in healthy individuals with mild to moderate gastrointestinal distress without exacerbating symptoms.

Example 1A

Phage Study—Microbiota

Generally, reductions in E. coli populations were observed with bacteriophage consumption.

DNA extraction and sequencing. Collected stool samples were thawed and sub sampled with sterile cotton swabs. Fecal DNA was then extracted from the swabs using the FastDNA® KIT (MP Biomedical; Santa Ana, California) following modified manufacturer's instructions which included an additional wash step. Sequencing libraries were constructed by PCR amplification of the V4 region of the 16s rRNA gene using primers 515F and 806R following the protocol for the Earth Microbiome Project (http://www.earthmicrobiome.org/protocols-and-standards/16s/) (Gilbert, J. A., Jansson, J. K. & Knight, R. *BMC Biol* (2014) 12, 69]. Amplicons were purified using AxyPrep Mag PCR clean-up beads (Axygen; Corning, New York) and amplicons were quantified with a Quanti-iT PicoGreen dsDNA Assay Kit (Invitrogen; Eugene, Oregon), and pooled in equimolar ratios prior to sequencing at the Colorado State University Genomics Core facility using a 2×250 MiSeq flow cell (Illumina, San Diego, California).

Microbiota Analysis

Paired-end sequence reads were concatenated and all combined 16s sequences were filtered, trimmed and processed with the DADA2 implementation included in the open source bioinformatics tool myPhyloDB version 1.2.1 (www.myphylodb.org/) (Manter et al *Database J. Biol. Databases Curation* (2016)). Briefly, all primers were removed from each sequence using the open source Python program Cutadapt [Martin, M. *EMBnet.journal* 17, 10-12, 2011], and sequence variants were inferred using the default pipeline in DADA2. Each sequence variant identified in DADA2 was classified to the closest reference sequence contained in the Green Genes reference database (Vers. 13_5_99) using the usearch_global option (minimum identity of 97%) contained in the open source program VSEARCH [Rognes et al. *PeerJ* 4, e2584 (2016)]. ANCoVA, DiffAbund, and PICRUSt analyses were conducted in myPhyloDB and MicrobiomeAnalyst [Dhariwal, A. et al. *Nucleic Acids Res.* 45, W180-W188 (2017)] was used to calculate alpha diversity scores and Bray-Curtis distances.

Short Chain Fatty Acids (SCFAs)

Frozen fecal samples were extracted for short chain fatty acids (SCFAs) were extracted and analyzed as previously described (Sheflin et al, 2017). Briefly, fecal aliquots were extracted in acidified water (pH 2.5) containing an internal standard of 5 mM ethylbutyric acid. Suspended samples were homogenized sonicated, followed by centrifugation to remove particulate matter. Supernatant was analyzed on a GC-FID (Agilent 6890 Plus GC Series, Aglient 7683 Injector series, GC Column: TG-WAXMS A 30 m×0.25 mm×0.25 um). Peak areas were normalized to the internal standard and quantified using standard curves from dilutions of commercial stocks.

Fecal Triglycerides (TGs)

Fecal triglycerides were assessed using the Triglycerides Assay Kit (Cayman Chemicals, Ann Arbor, Michigan). Briefly, 75 mg of homogenized fecal sample was suspended in 1×NP40 reagent containing protease inhibitors. Samples were centrifuged at 4° C. for 10 minutes at 10,000 rpm. Supernatant was diluted 1:5 with 1×NP40 and absorbance at 530-550 nm was measured after incubation for 15 min at room temperature. Triglyceride quantity was determined by fitting to standard curves.

Local Inflammation and Immune Responses

Fecal Secretory Immunoglobulin A (sIgA) and fecal calprotectin were analyzed using the Human Secretory IgA ELISA Assay Kit and Calprotectin ELISA Assay kits (Eagle Biosciences, Amherst, New Hampshire), respectively.

Systemic Inflammation

Systemic inflammation was assessed by measuring plasma levels of c-reactive protein (CRP) as well as several chemokines and cytokines. CRP levels were assessed using Human hsCRP ELISA kits (BioVender LLC., Asheville, North Carolina) according to manufacturer's instructions. In addition, thirteen different chemokines/cytokines, which included: GM-CSF, IFNγ, IL-1α, IL-2, IL-4, IL-5, IL-6, IL-7, IL-8, IL-10, IL-12 (p70), IL-13, and TNF-α were measured using the Milliplex MAP Human High Sensitivity T Cell panel (Millipore Sigma, Burlington, Massachusetts). All samples were processed according to the manufacturers' protocols and analyzed on a Luminex instrument (LX200; Millipore, Austin, Texas).

Plasma Lipids

Lipid Panels (total cholesterol, high-density lipoprotein cholesterol (HDL-C), triglycerides, non-high-density lipoprotein cholesterol (nHDL-C), total cholesterol/HDL-C ratio, low-density lipoprotein cholesterol (LDL-C) and very low-density lipoprotein cholesterol (VLDL-C) were assayed within one hour of blood collection using a Piccolo Xpress Chemistry Blood Analyzer (Abaxis, Union City, California).

Statistical Analysis

To evaluate the effects of starting sequence, differences between baseline levels were assessed for each sequence (A-B, B-A). Continuous data were tested for normality prior to performing linear regression analysis. A linear mixed model approach, controlling for sequence and repeated measures, was used to compare treatment effects within each time point and between time points within a treatment group. A p value of 0.05 was used to assess statistical significance. Prior to statistical analysis, microbiota data were normalized using Laplace smoothing followed by sub sampling with replacement (rarefaction (keep) command). Data were rarefied to 31,037 sequence reads using 100 iterations. OTUs that were present in less than 25% of the total samples were excluded from analyses. An Analysis of Covariance (ANCOVA) model was used to assess taxonomic differences across treatment groups, and genewise negative binomial GLM (EdgeR; adjusted p-value for statistical significance was set as q<0.05) was used to determine differential analysis of taxa and KEGG classes between treatments. Measures of alpha (CHAO1 estimates, Shannon and Simpson diversity indices) and beta diversity (Bray-Curtis distances) were statistically analyzed using non-parametric Kruskal-Wallace tests.

Following are results of 16s sequence and targeted metabolite analysis from stool samples as well plasma lipids and markers of inflammation.

Gut Microbiota and Metabolite Analysis

Bacterial sequences classified to seven phyla, with the majority being represented by Firmicutes followed by Bacteroidetes, with minor components including Actinobacteria, Proteobacteria, and Verrucomicrobiota. There were no significant differences in bacterial taxa between treatment groups and timepoints. In addition, richness estimates (CHAO1) and α-diversity, calculated as Shannon and Simpson's indices, did not vary across groups. PCoA visualization of Bray-Curtis distances did not show any significant clustering between treatments groups or timepoints.

Because the phage supplement specifically targeted E. coli, we identified operational taxonomic units (OTUs) in each sample that mapped to E. coli. Only 21 total participants had detectable levels of E. coli prior to starting the treatment period. Baseline levels varied significantly among participants, ranging from 0.01-3.2%) of total reads. Response rate was 68%, with fifteen participants that had detectable E. coli prior to the treatment period showing reduced or undetectable levels after treatment. Overall, E.

Figure 6:
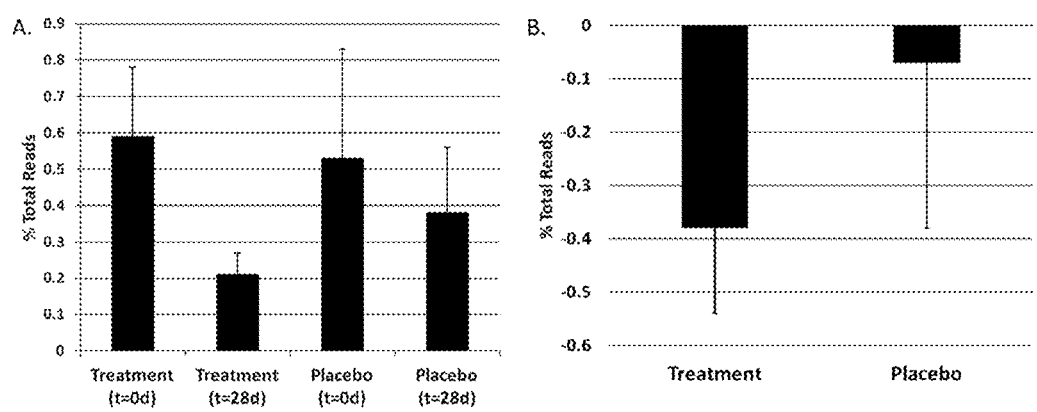
FIG. 6 depicts reduction of *E. coli* levels after treatment with PREFORPRO® compared to Placebo. (A) Percent of total reads represented by OTUs mapping to *E. coli* for each treatment and timepoint. (B) Change in *E. coli* levels from baseline values after treatment or placebo consumption. Data represents only individuals with baseline *E. coli* levels (n=21). Error bars represent SEM.

*coli* levels were significantly reduced with phage treatment (p=0.03-all population; p=0.02-baseline *E. coli* only) but not with the placebo (FIG. 6).

Several microbial taxa were significantly correlated with fecal levels of *E. coli*, regardless of intervention period. *Oxalobacter formigenes* and OTUs assigned to the Lachnospiraceae family were negatively correlated with *E. coli* populations. Conversely, several OTUs identified as belonging to the Ruminococcaceae family were positively correlated with *E. coli* as was a *Desulfovibrio* spp. Setting criteria of q<0.05 for both baseline to treatment Day 28 and Day 28 placebo to treatment comparisons, we identified specific bacterial taxa that differed in their abundance after phage consumption. A *Desulfovibrio* sp. was among the taxa that were decreased with phage consumption (Table 4).

Other taxa that were reduced after phage consumption and lower after treatment than placebo included *Colinsella stercoris*, an unclassified *Bifidobacterium* and *Lactobacillus*, and a Streptococcaceae. In contrast, *Streptococcus luteciae*, probiotic *Lactobacillus delbrueckii*, and butyrate-producing *Eubacterium cylindroides* were enriched after 28 days of phage consumption and higher post-treatment compared to post-placebo (Table 4).

Table 4 presents bacterial taxa that had significant differential abundance between after phage treatment and compared to placebo.

TABLE 4

| Bacteria | Log Change from Baseline | Likelihood Ratio | FDR | Log Change from Placebo | Likelihood Ratio | FDR |
|---|---|---|---|---|---|---|
| *Eubacterium cylindroides* | 4.00 | 34.04 | 3.25E−07 | 4.10 | 37.09 | 2.05E−07 |
| *Citrobacter* unclass | 3.60 | 26.25 | 9.05E−06 | 2.06 | 10.2 | 1.27E−02 |
| *Lactobacillus delbrueckii* | 2.85 | 14.39 | 1.00E−03 | 3.97 | 26.8 | 1.36E−05 |
| *Streptococcus luteciae* | 2.31 | 15.51 | 9.88E−04 | 2.32 | 16.31 | 8.10E−04 |
| SMB53 unclass | 2.03 | 12.96 | 2.41E−03 | 2.05 | 13.66 | 2.75E−03 |
| *Neisseria subflava* | 1.42 | 7.08 | 3.45E−02 | 1.47 | 7.89 | 3.91E−02 |
| *Slackia* unclass | −2.30 | 9.01 | 1.35E−02 | −2.62 | 11.49 | 7.04E−03 |
| *Lactobacillus* unclass | −2.71 | 20.9 | 8.74E−05 | −1.78 | 9.62 | 1.66E−02 |
| Streptococcaceae unclass | −2.74 | 10.35 | 7.58E−03 | −2.81 | 10.95 | 8.94E−03 |
| S24-7 | −3.39 | 16.27 | 7.07E−04 | −4.41 | 25.27 | 1.81E−05 |
| *Bifidobacterium* unclass | −4.95 | 24.88 | 1.58E−05 | −4.61 | 22.52 | 4.19E−05 |
| *Colinsella stercoris* | −5.68 | 28.87 | 3.51E−06 | −4.82 | 23.2 | 3.30E−05 |
| *Desulfovibrio* D168 | −5.90 | 27.65 | 5.28E−06 | −4.08 | 16.79 | 6.87E−04 |

To assess functional changes in the microbiota, we also assayed fecal short chain fatty acid (SCFA) profiles. Acetate was the most abundant SCFA, averaging 10-20 mM/gram of stool across all treatments and timepoints. Propionate and butyrate were detected in levels of approximately 2-4 mM/gram of stool. There were no significant differences in any of the SCFA detected across timepoints or between treatment periods, although there was a trend towards increased acetate from baseline levels within the placebo period (p=0.06; CI=−0.09 to 3.15).

Stool and Plasma Lipid Profiles

Since the microbiota has also been implicated in lipid absorption, total triglyceride levels were measured in stool. Although there was significant inter-individual variability, there were no significant differences in fecal triglycerides across timepoints or between treatment periods (Table 5), although there was a significant period effect noted for participants starting on the placebo and transitioning to the treatment group (p=0.03; CI=−8.93 to −0.49). Likewise, there were no significant changes across time periods or between treatments for plasma lipids associated with phage consumption; however, there was a significantly higher total cholesterol:HDL ratio (TC/H) between the baseline (t=0 d) and Day 28 of the placebo period (p=0.045; CI=0.00 to 0.18), likely driven by a trend towards reduced HDL cholesterol during this period (p=0.08; CI=−3.87 to −1.75) (Table 5).

TABLE 5

| | Treatment (t = 0 d) | Treatment (t = 28 d) | Placebo (t = 0 d) | Placebo (t = 28 d) |
|---|---|---|---|---|
| Fecal Triglycerides (mg/dl) | 6.70 (±0.70) | 8.12 (±0.89) | 9.25 (±1.14) | 7.46 (±0.79) |
| Cholesterol (mg/dl) | 189.70 (±4.93) | 187.18 (±4.83) | 192.03 (±5.76) | 189.35 (±6.08) |
| LDL (mg/dl) | 103.48 (±3.56) | 100.82 (±4.23) | 106.76 (±4.85) | 103.06 (±4.67) |

TABLE 5-continued

|  | Treatment (t = 0 d) | Treatment (t = 28 d) | Placebo (t = 0 d) | Placebo (t = 28 d) |
|---|---|---|---|---|
| vLDL (mg/dl) | 20.21 (±1.82) | 20.52 (±1.87) | 19.62 (±1.94) | 19.85 (±1.94) |
| HDL (mg/dl) | 65.06 (±2.51) | 65.24 (±2.58) | 65.74 (±2.33) | 63.91 (±2.84) |
| nHDLc (mg/dl) | 123.61 (±4.89) | 122.85 (±4.98) | 126.21 (±5.68) | 125.62 (±5.40) |
| TC/H | 3.03 (±0.13) | 3.01 (±0.14) | 3.02 (±0.13) | 3.11 (±0.14) |
| Plasma Triglycerides (ng/dl) | 99.94 (±9.11) | 102.61 (±9.46) | 97.74 (±9.70) | 99.41 (±9.77) |

Detailed Analysis of Immunological and Inflammatory Markers

As discussed above, several stool and blood markers indicative of inflammatory state and immunologic activity were examined. In stool, fecal calprotectin and secretory immunoglobulin A (sIgA) were measured. Fecal calprotectin was below the detection limits of the assay for the majority of samples tested (data not shown). Fecal sIgA was detectable, and the majority of samples fell within clinically normal ranges (510-2040 µg/ml). There were no significant differences in this parameter across timepoints or between treatment periods, although there was large variability between individuals and even between timepoints for select individuals. In plasma, we analyzed C-reactive protein using a high sensitivity ELISA assay (hsCRP) as well as a panel of 13 human cytokines. There were no significant responses across timepoints or between treatments in these parameters with one exception. Interleukin-4 (IL-4) was significantly reduced from baseline after 28 days of phage consumption (p=0.002; CI=−15.63 to −3.67) (Table 6).

Although no community-level changes to the microbiota were apparent with phage treatment, there were significant increases and reductions in certain members of the microbial community. Importantly, *E. coli*, which were the targets of the consumed phage consortium, were reduced at the end of the treatment period. Several bacterial taxa were positively or negatively correlated with levels of *E. coli*, suggesting that these bacteria may be affected by phage-driven reductions in *E. coli*. Indeed, *Desulfovibrio* was positively associated with *E. coli* levels and was also significantly reduced after the treatment period.

*Eubacterium* reductions have also been associated with several inflammatory conditions in the gastrointestinal tract. *Eubacterium* spp. are butyrate producers and as such may be important in stimulating enterocyte turnover and maintaining tight barrier junctions. However, an overall increase in stool butyrate was not observed with PREFORPRO® treatment. This may be due to the high level of inter-individual variation in SCFA production which may have masked responses within certain individuals. It may also be due to

TABLE 6

|  | Treatment (t = 0 d) | Treatment (t = 28 d) | Placebo (t = 0 d) | Placebo (t = 28 d) |
|---|---|---|---|---|
| hsCRP (mg/ml) | 1.76 (±0.51) | 1.79 (±0.52) | 1.56 (±0.41) | 2.45 (±0.68) |
| GMCSF (pg/ml) | 80.69 (±9.99) | 80.54 (±10.35) | 83.17 (±9.78) | 80.59 (±10.10) |
| IFN-γ (pg/ml) | 12.67 (±1.12) | 12.29 (±1.02) | 14.21 (±1.86) | 13.81 (±1.89) |
| IL-10 (pg/ml) | 24.13 (±3.30) | 23.53 (±2.85) | 26.03 (±3.75) | 24.83 (±3.84) |
| IL-12 (pg/ml) | 3.57 (±0.33) | 3.57 (±0.32) | 3.75 (±0.35) | 3.55 (±0.37) |
| IL-13 (pg/ml) | 23.05 (±5.53) | 22.16 (±5.71) | 25.39 (±6.06) | 24.5 (±5.73) |
| IL-1β (pg/ml) | 1.76 (±0.13) | 1.71 (±0.10) | 1.85 (±0.13) | 1.73 (±0.12) |
| IL-2 (pg/ml) | 2.24 (±0.14) | 2.15 (±0.18) | 2.46 (±0.28) | 2.36 (±0.31) |
| IL-4 (pg/ml) | 69.48 (±5.75) | 59.83 (±4.43) | 63.79 (±4.95) | 61.71 (±3.88) |
| IL-5 (pg/ml) | 8.16 (±3.26) | 5.55 (±1.35) | 7.85 (±2.71) | 6.38 (±1.57) |
| IL-6 (pg/ml) | 3.37 (±0.33) | 3.43 (±0.33) | 3.76 (±0.38) | 3.82 (±0.41) |
| IL-7 (pg/ml) | 13.37 (±1.07) | 13.39 (±1.14) | 13.91 (±1.16) | 13.35 (±1.12) |
| IL-8 (pg/ml) | 4.14 (±0.70) | 4.24 (±0.77) | 4.51 (±0.83) | 4.45 (±0.81) |
| TNFα (pg/ml) | 4.45 (±0.29) | 4.18 (±0.25) | 4.23 (±0.24) | 4.09 (±0.26) |

Bacteriophages offer a novel and selective means of modifying the gut microbiota and thereby influencing the intestinal environment without causing global perturbations that can lead to microbial dysbiosis. In the current study, it was confirmed that phage treatment was not associated with global perturbations in the gut microbiota as evidenced by a lack of differences in community descriptors such as richness and diversity between treatments or over time. Furthermore, no clustering of groups was apparent on a PCoA plot of Bray-Curtis distances. Disruption of microbial communities by antibiotics and other pharmaceutical treatments can predispose individuals to dysbiosis and create ecological niches where pathogens can establish a foothold, as is commonly seen with *Clostridium difficile* infections. Thus, phages represent a novel means of selectively modifying the microbiota without causing global disruptions to community structure, in the gut and elsewhere.

differences in fiber intake between individuals, as this is a necessary substrate for SCFA production despite increases in butyrate-producing bacteria. Thus, certain beneficial gut bacterial species are increased upon treatment with PREFORPRO®.

In addition to increases in beneficial species with PREFORPRO® consumption, reductions in potentially harmful bacteria were also observed. In particular, a taxa mapping most closely to *Clostridium perfringens* was shown to be reduced by more than 2-fold relative to the placebo. Another taxa, which appears to be a Gram-positive sulfate-reducing bacteria (SRB) was also significantly reduced. Although the physiological role of SRB in the gastrointestinal tract is still not well understood, it is commonly accepted that production of hydrogen sulfide could have direct inflammatory, cytotoxic and genotoxic effects in the gut that could reduce epithelial barrier integrity. Mechanistically, the observed microbiota changes may be due to the opening of ecological niches caused by the reduction of *E. coli* targeted by the PREFORPRO® bacteriophages.

Another interesting change associated with phage consumption was the reduction of circulating Il-4 (as discussed above, see FIG. 5). This cytokine is released during Th2 responses, which are associated with promotion of IgE and eosinophilic responses to atopy. Anecdotally, this is relevant as several of the study participants reported issues with atopic dermatitis prior to the start of the study and described resolution of symptoms after completing the treatment arm. Without being bound by theory, and although the mechanisms relating IL-4 reduction with phage consumption are unclear, some studies have demonstrated that bacterial lipopolysaccharide (LPS) induces IL-4 production via a MyD88 and TRAM-dependent pathway. Although we do not have direct evidence of reduced circulating LPS, we previously reported lower AST and ALP in whole blood samples collected after the treatment compared to the placebo control. In a rodent model, AST and ALP increased after exposure to LPS. Circulating lipopolysaccharide (LPS) is associated with systemic inflammation and increased cytokine release. Therefore, it is plausible that phage treatment resulted in lower circulating LPS, which may drive reductions in IL-4. These data suggest that future experiments are warranted to further explore mechanistic links between IL-4 and phage consumption as well as examine the effect of the PREFORPRO® phage cocktail in a human population with atopic dermatitis and other allergic atopies.

PREFORPRO® is currently marketed as both a food and dietary ingredient and research in animal models demonstrates that when consumed simultaneously with probiotic bacteria, it stimulates their growth. The theoretical basis of this relationship is an alteration in biochemical cycles due to release of cell contents from phage targets that support the growth of other bacteria. Although we did observe increases in *Lactobacillus delbrueckii*, other lactic acid bacteria and an unclassified *Bifidobacterium* were decreased relative to placebo. Because baseline populations of these beneficial bacteria vary greatly between individuals and in response to diet and other factors, more consistent results might be achieved when co-consuming the phages with specific probiotic bacteria. As PREFORPRO® is commonly used as an ingredient in probiotic formulations, co-administration of this phage consortium with probiotic bacteria is contemplated.

Finally, a major strength of the current study is its crossover design, in which each individual serves as his or her own control. This is advantageous given the inter-person variability of the microbiota, particularly in target bacterial strains, as well as individual responses to a stimulus. An additional strength of this study design is the double-blinding, thus minimizing participant and researcher bias. Limitations of this study, like others, included variable compliance among study participants. In addition, lack of dietary assessment throughout the study may be seen as a weakness, as changes in diet are typical of consumers over a 10-week period and can promote or suppress gastrointestinal symptoms over short periods of time. Daily tracking of stool consistency and frequency would have been desirable but likely would have placed an additional burden on participants, reducing compliance and increasing attrition. Finally, although the small sample size does not allow for direct assessment of subpopulations (e.g., ethnic or life-stage groups), it does provide precise intervention effects at the population level on designated outcomes of interest and offers an overall risk-benefit assessment of whether individuals should consume bacteriophages-containing products. Thus, this study has demonstrated that administration of the PREFORPRO® product is beneficial for promoting and maintaining a healthy gut biome.

The method described herein effects maintenance of healthy gut microflora in an individual.

In certain embodiments, the compositions comprising bacteriophages can include one or more dry carriers selected from the group consisting of trehalose, maltodextrin, rice flour, microcrystalline cellulose, magnesium stearate, inositol, fructooligosaccharide, galactooligosaccharide, dextrose, tapioca, hypromellose, maltodextrin, coconut oil triglycerides and the like. In certain embodiments, the dry carrier can be added to the compositions comprising bacteriophages in a weight percentage of from about 1% to about 95% by weight of the composition.

In certain embodiments, the compositions comprising bacteriophages can include one or more liquid or gel-based carriers, selected from the group consisting of water and physiological salt solutions, urea, water, alcohols and derivatives thereof (e.g., methanol, ethanol, propanol, butanol), glycols (e.g., ethylene glycol, propylene glycol), rice maltodextrin, coconut oil triglycerides, and the like; natural or synthetic flavorings and food-quality coloring agents, all compatible with the organism; thickening agents selected from the group consisting of corn starch, guar gum, xanthan gum, and the like; one or more spore germination inhibitors selected from the group consisting of hyper-saline carriers, methylparaben, guar gum, polysorbate, preservatives, and the like. In certain embodiments, the one or more liquid or gel-based carrier(s) can be added to the compositions comprising bacteriophages in a weight/volume percentage of from about 0.6% to about 95% weight/volume of the composition. In certain embodiments, the natural or synthetic flavoring(s) can be added to the compositions comprising bacteriophages in a weight/volume percentage of from about 3.0% to about 10.0% weight/volume of the composition. In certain embodiments, the coloring agent(s) can be added to the compositions comprising bacteriophages in a weight/volume percentage of from about 1.0% to about 10.0%) weight/volume of the composition. In certain embodiments, the thickening agent(s) can be added to the compositions comprising bacteriophages in a weight/volume percentage of about 2% weight/volume of the composition. In certain embodiments, the one or more spore germination inhibitors can be added to the compositions comprising bacteriophages in a weight/volume percentage of about 1% weight/volume of the composition.

Delivery System

Suitable dosage forms, including oral dosage forms, include tablets, capsules, solutions, suspensions, powders, gums, and confectionaries. Sublingual delivery systems include, but are not limited to, dissolvable tabs under and on the tongue, liquid drops, and beverages. Edible films, hydrophilic polymers, oral dissolvable films, or oral dissolvable strips can be used. Other useful delivery systems comprise oral or nasal sprays or inhalers, and the like.

For oral administration, probiotics may be further combined with one or more solid inactive ingredients for the preparation of tablets, capsules, pills, powders, granules, or other suitable dosage forms. For example, the active agent may be combined with at least one excipient selected from the group consisting of fillers, binders, humectants, disintegrating agents, solution retarders, absorption accelerators, wetting agents, absorbents, and lubricating agents. Other useful excipients include, but are not limited to, magnesium stearate, calcium stearate, mannitol, xylitol, sweeteners, starch, carboxymethylcellulose, microcrystalline cellulose, silica, gelatin, silicon dioxide, and the like.

In certain embodiments, the components of compositions administered according to the methods of the present disclosure, together with one or more conventional adjuvants, carriers, or diluents, may thus be placed into the form of pharmaceutical compositions and unit dosages thereof. Such forms include: solids, and in particular, tablets, filled capsules, powder and pellet forms; liquids, and in particular, aqueous or non-aqueous solutions, suspensions, emulsions, elixirs; and capsules filled with the same; all for oral use, suppositories for rectal administration, and sterile injectable solutions for parenteral use. Such pharmaceutical compositions and unit dosage forms thereof may comprise conventional ingredients in conventional proportions, with or without additional active compounds or principles, and such unit dosage forms may contain any suitable effective amount of the active ingredient commensurate with the intended daily dosage range to be employed.

The components of the compositions administered according to the methods of the present disclosure can be administered in a wide variety of oral and parenteral dosage forms. It will be obvious to those skilled in the art that the following dosage forms may comprise, in certain embodiments, as the active component, either a chemical compound of the present disclosure or a pharmaceutically acceptable salt of a chemical compound of the present disclosure.

For preparing pharmaceutical compositions to be administered according to the methods of the present disclosure, pharmaceutically acceptable carriers or excipients can be either solid or liquid. Solid form preparations include powders, tablets, pills, capsules, cachets, suppositories, and dispersible granules. A solid carrier can be one or more substances that may also act as diluents, flavoring agents, solubilizers, lubricants, suspending agents, binders, preservatives, tablet disintegrating agents, or encapsulating materials.

In powders, the carrier is a finely divided solid, which is in a mixture with the finely divided active component. In tablets, the active component is mixed with the carrier having the necessary binding capacity in suitable proportions and compacted in the shape and size desired.

In certain embodiments, powders and tablets administered according to methods of the present disclosure preferably may contain from five or ten to about seventy percent of the active compound. Suitable carriers are magnesium carbonate, magnesium stearate, talc, sugar, lactose, pectin, dextrin, starch, gelatin, tragacanth, methylcellulose, sodium carboxymethylcellulose, a low melting wax, cocoa butter, and the like. The term "preparation" is intended to include the formulation of the active compound with encapsulating material as carrier providing a capsule in which the active component, with or without additional carriers, is surrounded by a carrier, which is thus in association with it. Similarly, cachets and lozenges are included. Tablets, powders, capsules, pills, cachets, and lozenges are included. Tablets, powders, capsules, pills, cachets, and lozenges can be used as solid forms suitable for oral administration.

Liquid preparations include, but are not limited to, solutions, suspensions, and emulsions, for example, water or water-propylene glycol solutions. For example, parenteral injection liquid preparations can be formulated as solutions in aqueous polyethylene glycol solution. In certain embodiments, chemical compounds administered according to methods of the present disclosure may thus be formulated for parenteral administration (e.g., by injection, for example, bolus injection or continuous infusion) and may be presented in unit dose for administration in ampoules, pre-filled syringes, small-volume infusion, or in multi-dose containers with an added preservative. The compositions may take such forms as suspensions, solutions, or emulsions in oily or aqueous vehicles, and may contain formulation agents such as suspending, stabilizing, and/or dispersing agents. Alternatively, the active ingredient may be in powder form, obtained by aseptic isolation of sterile solid or by lyophilization from solution, for constitution with a suitable vehicle, e.g., sterile, pyrogen-free water, before use.

Aqueous solutions suitable for oral use can be prepared by dissolving the active component in water and adding suitable colorants, flavors, stabilizing and thickening agents, as desired. Aqueous suspensions suitable for oral use can be made by dispersing the finely divided active component in water with viscous material, such as natural or synthetic gums, resins, methylcellulose, sodium carboxymethylcellulose, or other well-known suspending agents.

Compositions suitable for topical administration in the mouth, or sublingual administration, include, but are not limited to: lozenges comprising the active agent in a flavored base, usually sucrose and acacia or tragacanth; pastilles comprising the active ingredient in an inert base such as gelatin and glycerine or sucrose and acacia; and mouthwashes comprising the active ingredient in suitable liquid carrier.

Solutions or suspensions are applied directly to the nasal cavity by conventional means, for example, with a dropper, pipette, or spray. The compositions may be provided in single or multi-dose form. In compositions intended for administration to the respiratory tract, including intranasal compositions, the compound will generally have a small particle size, for example, of the order of 5 microns or less. Such a particle size may be obtained by means known in the art, for example, by micronization.

The pharmaceutical preparations are preferably in unit dosage forms. In such form, the preparation is subdivided into unit doses containing appropriate quantities of the active component. The unit dosage form can be a packaged preparation, the package containing discrete quantities of preparation, such as packaged tablets, capsules, and powders in vials or ampoules. Also, the unit dosage form can be a capsule, tablet, cachet, or lozenge itself; or it can be the appropriate number of any of these in packaged form.

Tablets, capsules, and lozenges for oral administration and liquids for oral use are preferred compositions. Solutions or suspensions for application to the nasal cavity or to the respiratory tract are preferred compositions. Transdermal patches for topical administration to the epidermis are preferred.

Further details on techniques for formulation and administration may be found in the latest edition of Remington's Pharmaceutical Sciences (Mack Publishing Co., Easton, PA).

Routes of Administration

The bacteriophage containing compositions may be administered by any route, including, but not limited to, oral, sublingual, buccal, ocular, pulmonary, rectal, and parenteral administration, or as an oral or nasal spray (e.g., inhalation of nebulized vapors, droplets, or solid particles). Parenteral administration includes, for example, intravenous, intramuscular, intraarterial, intraperitoneal, intranasal, intravaginal, intravesical (e.g., to the bladder), intradermal, transdermal, topical, or subcutaneous administration. Also contemplated within the scope of the invention is the instillation of a pharmaceutical composition in the body of the patient in a controlled formulation, with systemic or local release of the drug to occur at a later time. For example, the drug may be localized in a depot for controlled release to the circulation, or for release to a local site.

Pharmaceutical compositions of the invention may be those suitable for oral, rectal, bronchial, nasal, pulmonal, topical (including buccal and sub-lingual), transdermal, vaginal or parenteral (including cutaneous, subcutaneous, intramuscular, intraperitoneal, intravenous, intraarterial, intracerebral, intraocular injection, or infusion) administration, or those in a form suitable for administration by inhalation or insufflation, including powders and liquid aerosol administration, or by sustained release systems. Suitable examples of sustained release systems include semipermeable matrices of solid hydrophobic polymers containing the compound of the invention, which matrices may be in the form of shaped articles, e.g. films or microcapsules.

The use of the terms "a," "an," "the," and similar referents in the context of describing the present invention (especially in the context of the claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Use of the term "about" is intended to describe values either above or below the stated value in a range of approximately ±10%; in other embodiments, the values may range in value above or below the stated value in a range of approximately ±5%; in other embodiments, the values may range in value above or below the stated value in a range of approximately ±2%; in other embodiments, the values may range in value above or below the stated value in a range of approximately ±1%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise stated. No language in the specification should be construed as indicating any non-claimed element as essential to the practice of the invention.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All references cited herein are incorporated by reference in their entireties. The present invention may be embodied in other specific forms without departing from the spirit or essential attributes thereof, and, accordingly, reference should be made to the appended claims, rather than to the foregoing specification, as indicating the scope of the invention.

We claim:

1. A method for treating gastrointestinal inflammation or pain in a human by reducing fecal bacteria selected from *Escherichia coli, Desulfovibrio* spp., *Collinsella stercoris*, or *Streptococcus* spp. and increasing fecal levels of *Eubacterium* cylindroides, *Lactobacillus delbruekii*, or *Neisseria subflava*, comprising the steps of: measuring the plasma level of IL-4 in the human; orally administering to the human in need of such treatment a composition comprising bacteriophages selected from the Siphoviridae family and the Myoviridae family including LH01-Myoviridae, LL5-Siphoviridae, T4D-Myoviridae, and LL12-Myoviridae, for 14-28 days; and measuring the plasma level of IL-4 in the human after treatment, wherein the plasma level of IL-4 is decreased.

2. The method of claim 1, wherein total bacteriophages are present in an amount of about 1 mg to about 1000 mg containing $1 \times 10^3$ to $1 \times 10^9$ plaque-forming units/dose (PFU/dose).

3. The method of claim 2, wherein total bacteriophages are present in an amount of about 15 mg.

\* \* \* \* \*